(12) United States Patent
Kasper et al.

(10) Patent No.: US 6,392,378 B1
(45) Date of Patent: May 21, 2002

(54) METHOD FOR OPERATING AND CONTROLLING HYSTERESIS MOTORS

(75) Inventors: Horst Kasper, Geilenkirchen; Johann Mundt, Jülich, both of (DE)

(73) Assignee: Urenco Deutschland GmbH, Jülich (DE)

( * ) Notice: Subject to any disclaimer, the term of this patent is extended or adjusted under 35 U.S.C. 154(b) by 0 days.

(21) Appl. No.: 09/511,676

(22) Filed: Feb. 23, 2000

(30) Foreign Application Priority Data

Nov. 5, 1999 (DE) .......................... 199 53 295

(51) Int. Cl.$^7$ .................. H02P 1/46; H02P 3/18; H02P 5/28; H02P 7/36
(52) U.S. Cl. .................. 318/701; 318/705; 318/504; 318/805; 318/806; 318/812; 318/498
(58) Field of Search .................. 318/701, 705, 318/721, 722, 729, 799, 800, 805, 806, 812, 438, 498, 504, 254

(56) References Cited

U.S. PATENT DOCUMENTS

| | | | | |
|---|---|---|---|---|
| 4,109,288 A | * | 8/1978 | Berenson | 361/58 |
| 4,447,788 A | * | 5/1984 | Mundt et al. | 318/799 |
| 5,498,946 A | * | 3/1996 | Plumer et al. | 318/809 |

FOREIGN PATENT DOCUMENTS

| | | | | |
|---|---|---|---|---|
| JP | 54121922 A | * | 9/1979 | 318/701 |
| JP | 58133198 A | * | 8/1983 | 318/82 |
| JP | 61224898 A | * | 10/1986 | 318/701 |

\* cited by examiner

*Primary Examiner*—Robert E. Nappi
*Assistant Examiner*—Edgardo San Martin
(74) *Attorney, Agent, or Firm*—Klaus J. Bach

(57) ABSTRACT

In a method of operating and controlling hysteresis motors energized by a three-phase power supply and individually monitored by an operating monitoring system, whereby the effective power output of the individual motors is determined and the three-phase voltage is changed if the effective power output deviates from a predetermined range, the hysteresis motors are first energized at an intermediate range voltage until they reach nominal speed and are then running at synchronous speed, the supply voltage is then increased to an upper range, where the remanent magnet pole strength is impressed on the armature and then reduced to a lower range for continuous operation of the motors, the power output of the individual motors is monitored and, if it drops below a threshold indicating a switch to asynchronous operation, the operating voltage is again increased to the intermediate range for renewed synchronization.

4 Claims, 3 Drawing Sheets

METHOD FOR OPERATING AND CONTROLLING HYSTERESIS MOTORS

BACKGROUND OF THE INVENTION

The invention resides in a method for operating and controlling hysteresis motors, which are energized with a rotary voltage from a three-phase alternating current supply or a frequency converter and which are individually monitored by an operating monitoring system and which are controlled by changing the three-phase voltage depending on this monitored values.

The design principle of such hysteresis motors with permanent magnet poles impressed into the armature is shown and described in DE 32 32 914 C1. A method for optimizing the power input of a plurality of hysteresis motors arranged in parallel is known from DE 37 57 904 A1. In that case, the hysteresis motors are all energized by a common voltage source with a rotating voltage whose voltage level is adjustable. When, at nominal voltage, the motors have reached synchronous speed and the motors have switched from an asynchronous to a synchronous operation, the voltage is reduced while the synchronous motor speed is maintained until an optimal operating point with minimal effective and idle power consumption has been reached. This way of operating the motors however has certain problems since the operating range reserve, which is needed for a safe operation, becomes smaller the lower the rotating voltage becomes. The process therefore did not persist in practice. The efficiency of the hysteresis motors obtained remains therefore substantially below the theoretically possible values, since a substantial voltage reduction is not acceptable when taking the safety aspects referred to above into consideration.

It is the object of the present invention to provide a method of operating such motors in such an improved way that the efficiency of hysteresis motors is improved to over 90%, while operational safety and the capability of managing disturbances are maintained.

SUMMARY OF THE INVENTION

In a method of operating and controlling hysteresis motors energized by a three-phase power supply and individually monitored by an operating monitoring system, whereby the effective power output of the individual motors is determined and the three-phase voltage is changed if the effective power output deviates from a predetermined range, the hysteresis motors are first energized at an intermediate range voltage until they reach nominal speed and are running at synchronous speed, the supply voltage is then increased to an upper range and then reduced to a lower range for continuous operation of the motors, and the power output of the individual motors is monitored and, if it drops below a threshold indicating a switch to asynchronous operation, the operating voltage is again increased to the intermediate range for renewed synchronization.

By impressing the permanent magnets into the armature, which consists of a magnetizable steel, at a voltage, which is greater than two and half times the operating voltage, at nominal voltage, an increased efficiency with a flat maximum in the lower voltage range is achieved, when the rotating voltage decreases. This maximum is utilized with the present invention for continuous operation of the motors while maintaining a safety reserve. In contrast to the state of the art, in this lower voltage range not the increase of the effective power output is monitored but the shifting of a particular motor to asynchronism. As soon as this occurs, the voltage is increased to the intermediate range and the motor is again synchronized at normal frequency. By way of the monitoring system, it can be determined whether the shift to asynchronism is caused by a passing disturbance or the disturbance is a permanent. In the latter case, it is necessary to intervene from without.

An embodiment of the invention will be described below on the basis of the accompanying drawings:

DESCRIPTION OF A PREFERRED EMBODIMENTS

Figure 1:
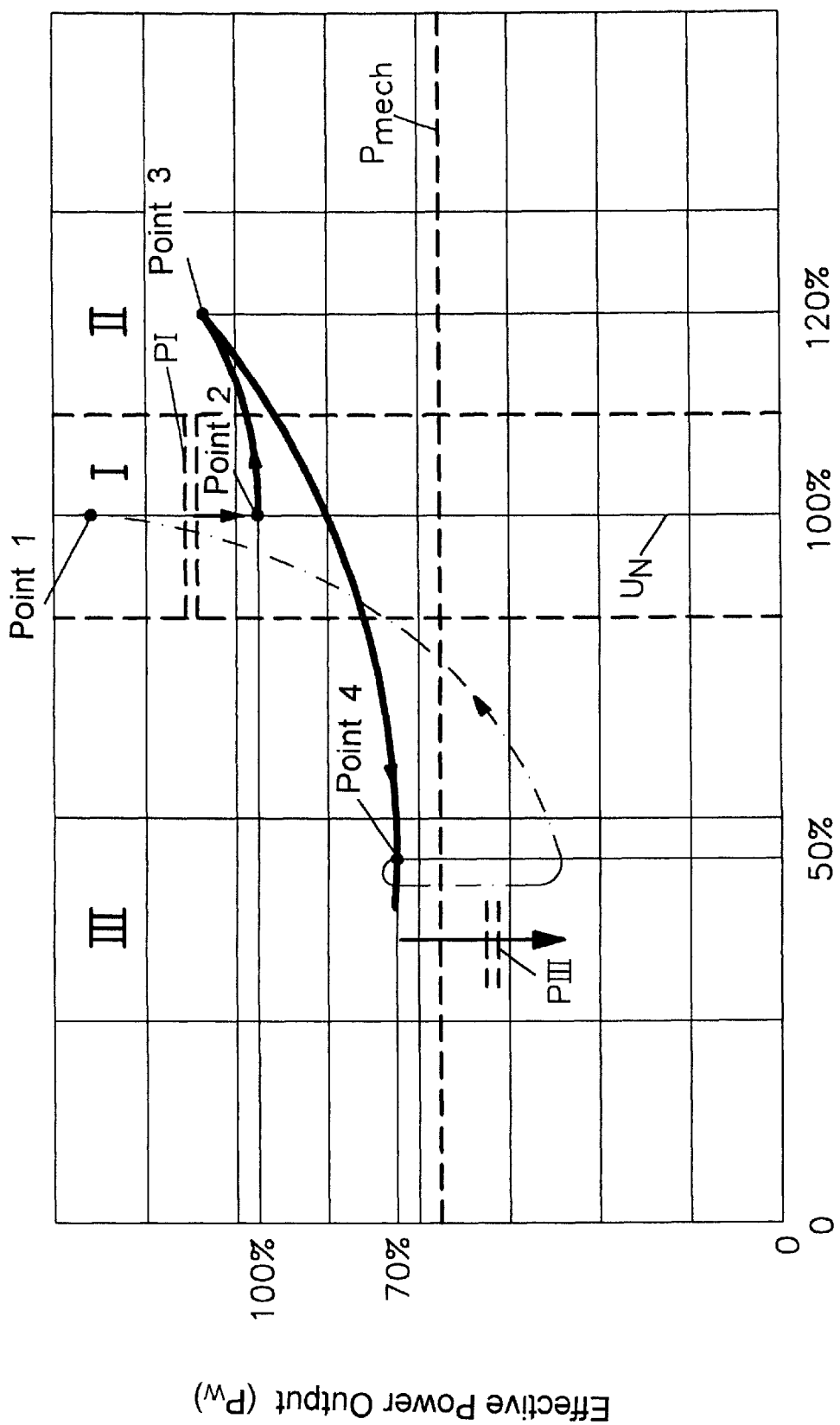
FIG. 1 represents a diagram including a curve showing the effective power output Pw (%) of a hysteresis motor over three voltage ranges I, II, III.

As shown in FIG. 1, the rotating voltage U, which is supplied to the hysteresis motors, is divided into three ranges I, II and III. The intermediate range I covers the nominal voltage $U_N$. The lower range III is below about 80% of the nominal voltage $U_N$.

When the hysteresis motors are energized for the first time the voltage and frequency are increased successively until the motors reach nominal speed, which occurs in the intermediate range I at nominal voltage $U_N$ (shift point 1). After synchronization, which is individually controlled for each hysteresis motor by an operating monitoring system, the motor drops to point 2 below the shift point 1. Starting with this nominal voltage, the operating monitoring system monitors any increase of the effective power output $P_w$, which must by below the asynchronous-threshold P(I) at any time.

From the point 2, the rotating voltage is then increased to about 120% $U_N$—corresponding to point 3 in the range II. At this voltage, the magnetic pole strength for the subsequent continuous operation is impressed on each armature of the hysteresis motors.

Subsequently, the rotating voltage is reduced to 50% $U_N$, whereby the operating point 4 in the range III for the continuous operation of the motors is reached. At this operating point 4, the effective power output has dropped to about 70% of that of point 2.

Figure 2:
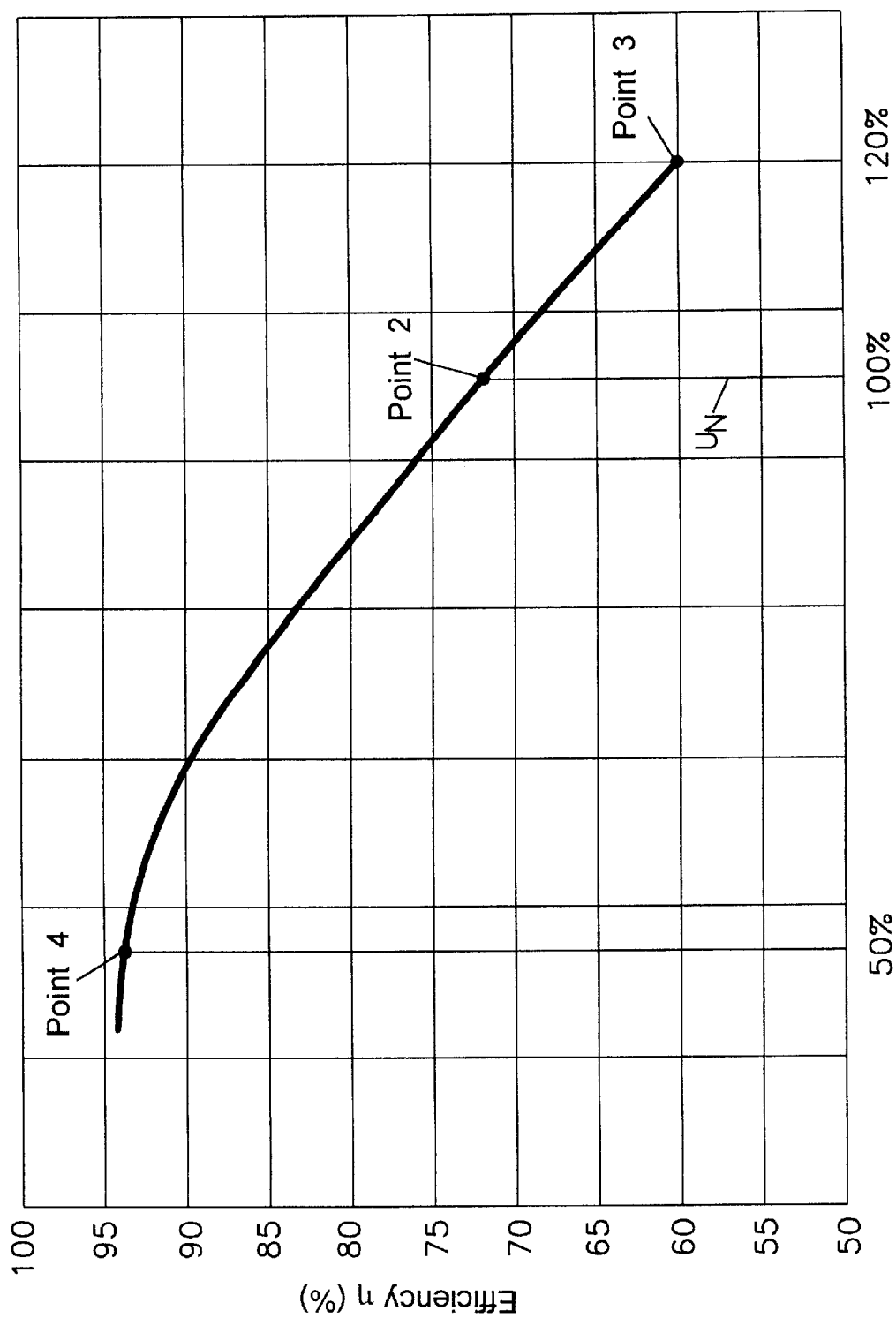
FIG. 2 shows the efficiency $\eta(\%)$ of a hysteresis motor over the voltage U% at constant load.

In FIG. 2, the efficiency $\eta(\%)$ is plotted over the voltage U. It shows a flat maximum in the area of the operating point 4, which can be utilized for an efficient operating mode.

Also, at the operating point 4, the effective power output $P_w$ of each hysteresis motor is constantly monitored to make sure that it does not drop below a threshold (PIII). A drop below the threshold (PIII) indicates a shift of the particular hysteresis motor from synchronous operation to asynchronous operation. This practically indicates a temporary or continuous fault. The voltage is therefore again increased to the nominal voltage $U_N$ (point 1) in the range I.

If the voltage then drops again to point 2, the fault of the respective hysteresis motor is only a temporary disturbance. In this case, the voltage can be increased to point 3 in the range II and then reduced to the operating point 4 in the range III.

However, if the monitoring of the power output by the monitoring system indicates that the respective faulty hysteresis motor does not reach the point 2, it is indicated that there is a permanent operating fault. The respective hysteresis motor must then be disconnected from the voltage source.

Figure 3:
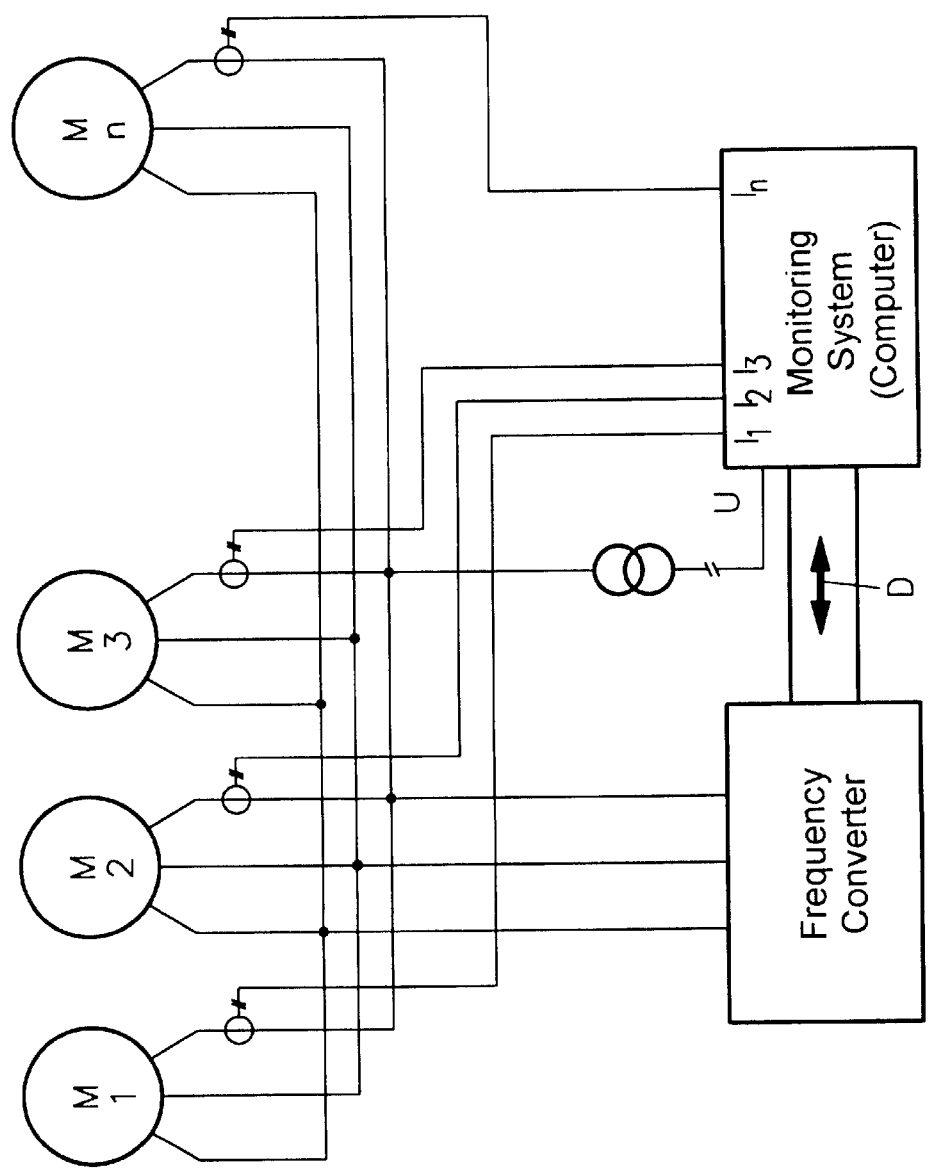
FIG. 3 is a schematic representation of the power supply and control for several hysteresis motors arranged in parallel circuits.

The circuit arrangement as shown in FIG. 3 shows several hysteresis motors $M_1, M_2, M_3 \ldots M_N$ arranged in parallel for driving gas centrifuges. They are supplied with a rotating voltage by a common frequency converter F. Each hysteresis motor is monitored by a computer of a monitoring system L, to which the current values $I_1, I_2, I_3 \ldots I_n$ of each motor and the common voltage U are supplied for determining the effective power outputs $P_{w1}, P_{w2}, P_{w3} \ldots P_{wn}$ of the various motors. The motors are controlled by an exchange of data (arrow D) between the monitoring system and the frequency converter F.

The method according to the invention can of course also be used during idling operation that is when the centrifuges driven by the motors are not filled with gas. It is however more advantageous for the motors to continue operation after synchronization in the range I under nominal load in order to permit better control of the operation not only of the motor but also of the associated gas centrifuge when placed under load.

What is claimed is:

1. A method of operating and controlling hysteresis motors, which
    a) are energized by a three-phase power supply and which
    b) are monitored individually by an operating monitoring system and whose power supply voltage is controlled depending on the values monitored,
    c) wherein, during operation of the motors, their effective power output is determined by the operating monitoring system and compared with motor-specific limit values, and
    d) the three-phase power supply voltage is varied if the effective power output deviates from a predetermined range, whereby
    e) the three-phase voltage is changed among three different ranges:
        an intermediate range I corresponding to a nominal voltage,
        an upper range II corresponding to a predetermined magnetization of the motor armatures, and
        a lower range III corresponding to an operating voltage providing for maximum efficiency taking into consideration a certain power reserve,
    f) upon original energization, the hysteresis motors are energized by the three-phase power supply at the intermediate range voltage until they reach nominal speed and are then transferred from asynchronous operation (point 1) to synchronous operation (point 2),
    g) after synchronization, the supply voltage is increased to the upper range II (point 3),
    h) after the voltage increase in accordance with g), the supply voltage is reduced to the lower range III (point 4) for continuous operation of the motors,
    i) in the lower range III, the effective power output of each hysteresis motor is constantly monitored and, if the effective power output of a motor drops below a threshold (PIII), which indicates a switch of the respective hysteresis motor out of synchronous operation, the operating voltage is again increased to the intermediate range I (point 1) for renewed synchronization, and
    j) after elimination of any fault causing the motor switch out of synchronous operation, the steps according to g) and c) are again initiated.

2. A method according to claim 1, wherein the voltage in the upper range II (point 3), wherein remanent magnet pole strength is impressed into the rotor armature, is at least 10% above the nominal voltage value in the intermediate range I (points 1, 2).

3. A method according to claim 1, wherein the voltage in the lower range III, where the optimal operating point (point 4) is disposed, is selected to be about half the nominal voltage in the intermediate range I (points 1, 2).

4. A method according to claim 1, wherein the steps f), g) and h) are performed at nominal load.

\* \* \* \* \*